Figure 1:
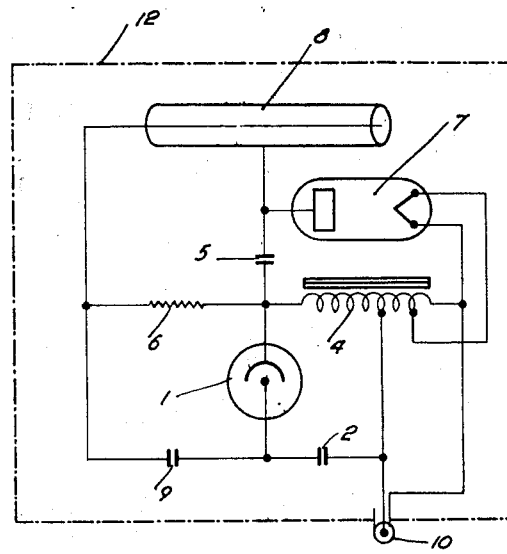
Figure 1:
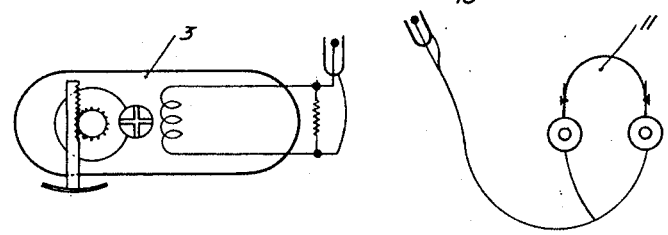

July 14, 1953  R. CHAMINADE  2,645,722

IONIZING RADIATION MOVABLE DETECTING DEVICE

Filed June 18, 1951

Inventor:
Robert Chaminade;
By his attorneys,
Baldwin & Wight

Patented July 14, 1953

2,645,722

UNITED STATES PATENT OFFICE 2,645,722

IONIZING RADIATION MOVABLE DETECTING DEVICE

Robert Chaminade, Plessis-Robinson, France, assignor to Commissariat à l'Energie Atomique, Paris, France, a corporation of France Application June 18, 1951, Serial No. 232,111
In France June 27, 1950

6 Claims. (Cl. 250—83.6)

The present invention relates broadly to ionizing radiation detecting devices and more particularly is a circuit arrangement for a radiation detector such as, for example, a Geiger meter.

It is well known that the working of radiation detectors calls for a potential difference to be maintained, varying from a few hundred to thousands of volts although the energy absorbed by radiation detectors is rather low.

In order to insure the feeding of the detecting apparatus of this invention the energy may be supplied, either directly from the distribution system, or through a converter, or through an independant generator such as a dynamo or a battery.

When the equipment is energized from a distribution system the problems of stanchness, which is necessary in most cases are easily resolved. But this method has the disadvantage of being applicable only in a fixed station. When a converter is made use of, good stanchness may be also realized under good conditions, but the weight and size of the whole unit are greatly increased, and the consumption in current is also greater because of the yield being lower. The use of batteries or accumulators makes it very delicate to realize the complete stanchness of those parts which are submitted to high voltage, which is also one of the batteries and accumulators themselves. Heretofore in order to insure the supply of power to the detecting apparatus, and to have a sufficient working reserve, it has been necessary to make use of a substantial battery because of the inevitable drain upon the batteries, even when the circuit is open. The apparatus is therefore necessarily heavy and large in size.

The present invention has for its object an ionizing radiation detecting device which is readily portable and which does away with these inconveniences and difficulties. This device fundamentally comprises a detector such as, for example, a Geiger meter to which a receiving device is associated through the primary of a transformer, said receiving device being for example a headphone enabling the indications given by said detector to be observed. The detector is connected to the terminals of a condenser with a high time constant, the condenser being previously charged through a tube, the filament of which is heated through said transformer which, during the charge, is fed through a generator or any other supply means, the secondary voltage being stabilized through the resonance of said transformer and a condenser which is put in circuit therewith through energization of a neon tube.

The whole unit may be enclosed in a tight casing, on the outside of which appears only a supply socket, which enables the primary of the transformer to be connected either to the receiving unit, or to the supply unit. The detector, itself, is thus fed by means of energy which has been accumulated in the condenser while connected to the supply source. This condenser maintains its charge during a long time period, and it is thus possible, after having charged the condenser, to separate the external supply source from the set which is inside the casing. It is accordingly possible to avoid the transport of the supply unit; this causes the device to be considerably lighter, the weight being about 300 gr. The set is mounted in a frame elastically supported, in order that the whole unit will not suffer from accidental falls.

In order to diminish the electrical leakages, the set is advantageously maintained under internal pressure by means of a filling with nitrogen under a pressure of 5 kg./cm.$^2$.

Figure 2:
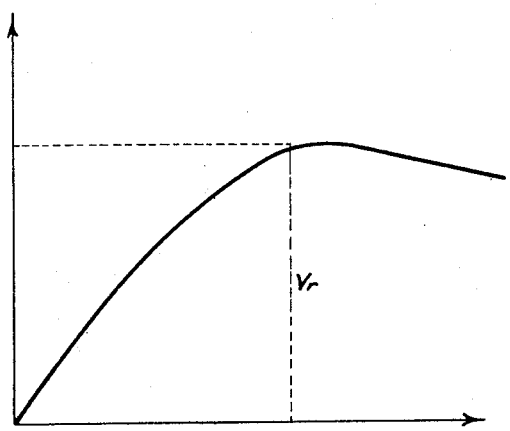

The present invention is further explained with more details, reference being made to the accompanying drawings, in which:

Fig. 1 is a schematic diagram of one form of circuit arrangement embodying the device of my invention; and Fig. 2 is a curve of the voltage across the terminals of the transformer in the device of my invention.

A gas tube 1, the energization voltage of which is of 70 volts, in series with a condenser 2 of 300 $\mu\mu$f. energizes, during the operation of an alternator or magneto 3, connected across terminals of a socket 10, as soon as the voltage across the secondary of the transformer 4 rises above 70 volts, the voltage then falling back to 60 volts. Condenser 2 practically maintains the whole of the secondary voltage, when said voltage has reached the crest value of 900 volts.

The circuit performs as if condenser 2 was connected to the secondary of transformer 4.

The voltage curve is obtained across terminals of the secondary of the transformer 4 as a function of the speed of generator 3, such a curve being shown in Fig. 2; the speed of the generator is plotted as abscissa and crest voltages are plotted as the ordinate.

The crest voltmeter system constituted by condenser 5 of 30,000 $\mu\mu$f. and tube 7 is thus charged through crest voltage Vr. Condenser 5 is thus charged at Vr, producing the voltage which is necessary for the Geiger meter counting unit 8.

During the charge, the return point of coupling condenser 9 of 100 μμf. is fixed by gas tube 1 to ±60 v. maximum with regard to the voltage of the positive armature of condenser 5. The Geiger meter is thus protected against any risk of volt-rise. This takes a few seconds in time. Generator 3 is then disconnected across the terminals of socket 10, and in lieu thereof the headphones 11 are connected and the apparatus is ready to work for a period of approximately two hours.

After the charge, gas tube 1 is no longer conducting; the transformer not being further energized and, charge impulses inducted on the wire of the Geiger meter or counting unit on behalf of an ionizing particle being detected, cannot flow towards the cathode of the Geiger meter, except through a path formed by condenser 9, condenser 2, the secondary of transformer 4 and condenser 5. The primary of the transformer 4 is thus submitted to an exchange of charges with the receiving unit which is connected to it, thus working as an impedance device. The correct charges are impressed upon the system through resistor 6, the value of which should be chosen in order that the time constant be high with regard to the duration of the impulse on the Geiger meter, this duration being of the order of one microsecond and with regard to the period of the transformer-receiver circuit approximately $30 \times 10^{-4}$ second but being less than the maximum frequency of the generator 4.

The unit which has been described, except for receiver 11 and generator 3, is enclosed in a tight casing which is indicated by dotted lines.

The apparatus of my invention can operate over a time period of approximately two hours following its period of charging. The charging period is extremely short and may be of the order of a few seconds during which time the hand driven alternator or magneto 3 is connected with socket 10. After the alternator or magneto 3 is disconnected from socket 10 and the headphones 11 connected in the socket 10, the operator can hear and count the pulses received on the sensitive surface of the Geiger meter counter 8.

The alternator or magneto 3 conducts current to transformer 4 so that the voltage rises therein sufficient to cause the striking of gas tube 1. Capacitor 2 is then subjected to the voltage from transformer 4 and forms with the winding of transformer 4 a tuned circuit through the gas tube 1. The resonance of this tuned circuit is chosen slightly lower than the steady state speed of the alternator, that is, of the order of 200 cycles per second.

When variations occur in the speed of the alternator, the alternating voltage varies, passing through a maximum. The rectifier 7-capacitor 5 assembly is so designed that this alternating voltage always remains less than the maximum peak value of the secondary voltage of the transformer 4. This value is thus very well defined by the characteristics of the transformer 4, of the alternator 3 and by the resonance frequency. This assembly, as well as the rectifier 7-capacitor 5 system insures the production of a stabilized high tension current.

During this process the power supply voltage for the Geiger meter counter 8 might be higher than its limiting operating voltage, due to the presence of the capacitor 9.

The striking of the gas tube 1 insures a first limitation of the voltage present at the ends of the circuit of this capacitor 9 and the anode resistance of the counter. This limitation, however, would be insufficient and in order to limit to a suitable value (30 volts for instance) the excess voltage on the counter 8, use is made of the filter action of this circuit with respect to the power supply voltage, by giving it a time constant at least five times smaller than the resonance period of the system consisting of the capacitor 2 and the secondary of the transformer 4.

When the telephone receiver, or headphones 11, is connected to socket 10 in lieu of the alternator or magneto 3, the voltage present on the gas tube 1 is insufficient to cause it to strike and it then offers a practically infinite impedance. The circuit may be traced from the Geiger meter counter 8 through capacitor 5, transformer 4, and capacitors 2 and 9. The resistor 6 connected between one side of the Geiger meter counter 8 and one side of capacitor 5 maintains the necessary average direct current voltage which is supplied to the Geiger meter counter 8 from the capacitor 5 operating as a secondary generator.

The value of the resistance should be higher than the impedance of the system: transformer 4-receiver 11 and of the second and third capacitors 2 and 9; the latter should have a capacity higher than the stray capacity of the winding of transformer 4.

The current variations corresponding to the pulses produced by the counter 8, when it operates, are transmitted through the capacitors 2 and 9 to the secondary of transformer 4 which, through its primary winding, energizes the headphones 11, provided a correct impedance match is insured allowing the use of a transmission line.

The duration of the pulse in the receiver 11 for giving the best acoustical efficiency, should be taken equal to the period of maximum sensitivity of the headphone assembly.

While I have described my invention in one of its preferred embodiments I realize that modifications may be made and I desire that it be understood that no limitations upon my invention are intended other than may be imposed by the scope of the appended claims.

What I claim is:

1. In a device for detecting ionizing radiations, a Geiger meter counter, a circuit extending from the terminals of said counter and including a capacitor, a gaseous discharge tube and an additional capacitor in series, a resistor connected between one of the terminals of said counter and a point intermediate said first mentioned capacitor and said gaseous discharge tube, a transformer, a further capacitor, a series circuit extending through said transformer, said further capacitor and said gaseous discharge tube, terminal connections leading to said transformer, a rectifier connected between said transformer and said first mentioned capacitor, a source of alternating current connectable with and disconnectable from said terminals leading to said transformer for charging said first mentioned capacitor, and impulse observing means connected with said terminals when said source of alternating current is disconnected therefrom.

2. A device for detecting ionizing radiations as set forth in claim 1 in which said resistor in coaction with said additional capacitor has a time constant which is larger than the time constant of said transformer.

3. A device for detecting ionizing radiations as set forth in claim 1 in which the time interval during which the source of alternating current is connected with the terminal connections leading to said transformer is of the order of seconds as compared to the time interval that said impulse observing means is connected with the said terminal connections which is of the order of hours.

4. A device for detecting ionizing radiations as set forth in claim 1 in which said rectifier is constituted by a tube having an anode and cathode, the anode of said tube being connected at a point intermediate one side of said first mentioned capacitor and the terminal of said Geiger meter counter and in which the cathode of said tube is connected with said transformer and is energized therefrom so long as the source of alternating current is connected with the terminal connections leading to said transformer.

5. A device for detecting ionizing radiations as set forth in claim 1 in which said transformer and the further capacitor which is connected in series therewith through said gaseous discharge tube is tuned to the frequency of the source of alternating current and in which said further capacitor maintains the voltage applied to said transformer when the source of alternating current is disconnected from the terminal connections leading to said transformer.

6. A device for detecting ionizing radiations as set forth in claim 1 in which said capacitor subjected to a charging operation from said applied source of alternating current discharges current to said impulse observing means when the source of alternating current is disconnected from the terminal connections leading to said transformer and the impulse observing means is connected in lieu thereof.

ROBERT CHAMINADE.

References Cited in the file of this patent

UNITED STATES PATENTS

| Number | Name | Date |
|---|---|---|
| 2,401,723 | Deming | June 11, 1946 |
| 2,474,773 | Baker | June 28, 1949 |

FOREIGN PATENTS

| Number | Country | Date |
|---|---|---|
| 187,741 | Switzerland | Nov. 30, 1936 |

OTHER REFERENCES

High-Voltage Supplies, Thomas Electronics, December 1948.